United States Patent
Mohammadi

(10) Patent No.: US 10,186,251 B1
(45) Date of Patent: Jan. 22, 2019

(54) VOICE CONVERSION USING DEEP NEURAL NETWORK WITH INTERMEDIATE VOICE TRAINING

(71) Applicant: Seyed Hamidreza Mohammadi, Pasadena, CA (US)

(72) Inventor: Seyed Hamidreza Mohammadi, Pasadena, CA (US)

(73) Assignee: OBEN, INC., Pasadena, CA (US)

( * ) Notice: Subject to any disclaimer, the term of this patent is extended or adjusted under 35 U.S.C. 154(b) by 0 days.

(21) Appl. No.: 15/229,047

(22) Filed: Aug. 4, 2016

Related U.S. Application Data

(60) Provisional application No. 62/201,960, filed on Aug. 6, 2015.

(51) Int. Cl.
| | | |
|---|---|---|
| *G10L 13/047* | (2013.01) | |
| *G10L 25/30* | (2013.01) | |
| *G10L 13/033* | (2013.01) | |
| *G10L 13/08* | (2013.01) | |
| *G10L 15/02* | (2006.01) | |

(52) U.S. Cl.
CPC ........ *G10L 13/047* (2013.01); *G10L 13/0335* (2013.01); *G10L 13/08* (2013.01); *G10L 15/02* (2013.01); *G10L 25/30* (2013.01)

(58) Field of Classification Search
CPC ....... G10L 13/047; G10L 15/02; G10L 13/08; G10L 25/30; G10L 13/0335

USPC .......................................................... 704/259
See application file for complete search history.

(56) References Cited

U.S. PATENT DOCUMENTS

| | | | | |
|---|---|---|---|---|
| 5,327,521 A | * | 7/1994 | Savic | G10L 21/00 704/200 |
| 6,134,528 A | * | 10/2000 | Miller | G06F 17/277 704/258 |
| 8,527,276 B1 | * | 9/2013 | Senior | G06N 3/084 704/258 |
| 2012/0065957 A1 | * | 3/2012 | Jungblut | G06F 17/2827 704/3 |

* cited by examiner

Primary Examiner — Bharatkumar S Shah
(74) Attorney, Agent, or Firm — Andrew S. Naglestad

(57) ABSTRACT

A system and method of converting source speech to target speech using intermediate speech data is disclosed. The method comprises identifying intermediate speech data that match target voice training data based on acoustic features; performing dynamic time warping to match the second set of acoustic features of intermediate speech data and the first set of acoustic features of target voice training data; training a neural network to convert the intermediate speech data to target voice training data; receiving source speech data; converting the source speech data to an intermediate speech; converting the intermediate speech to a target speech sequence using the neural network; and converting the target speech sequence to target speech using the pitch from the target voice training data.

12 Claims, 4 Drawing Sheets

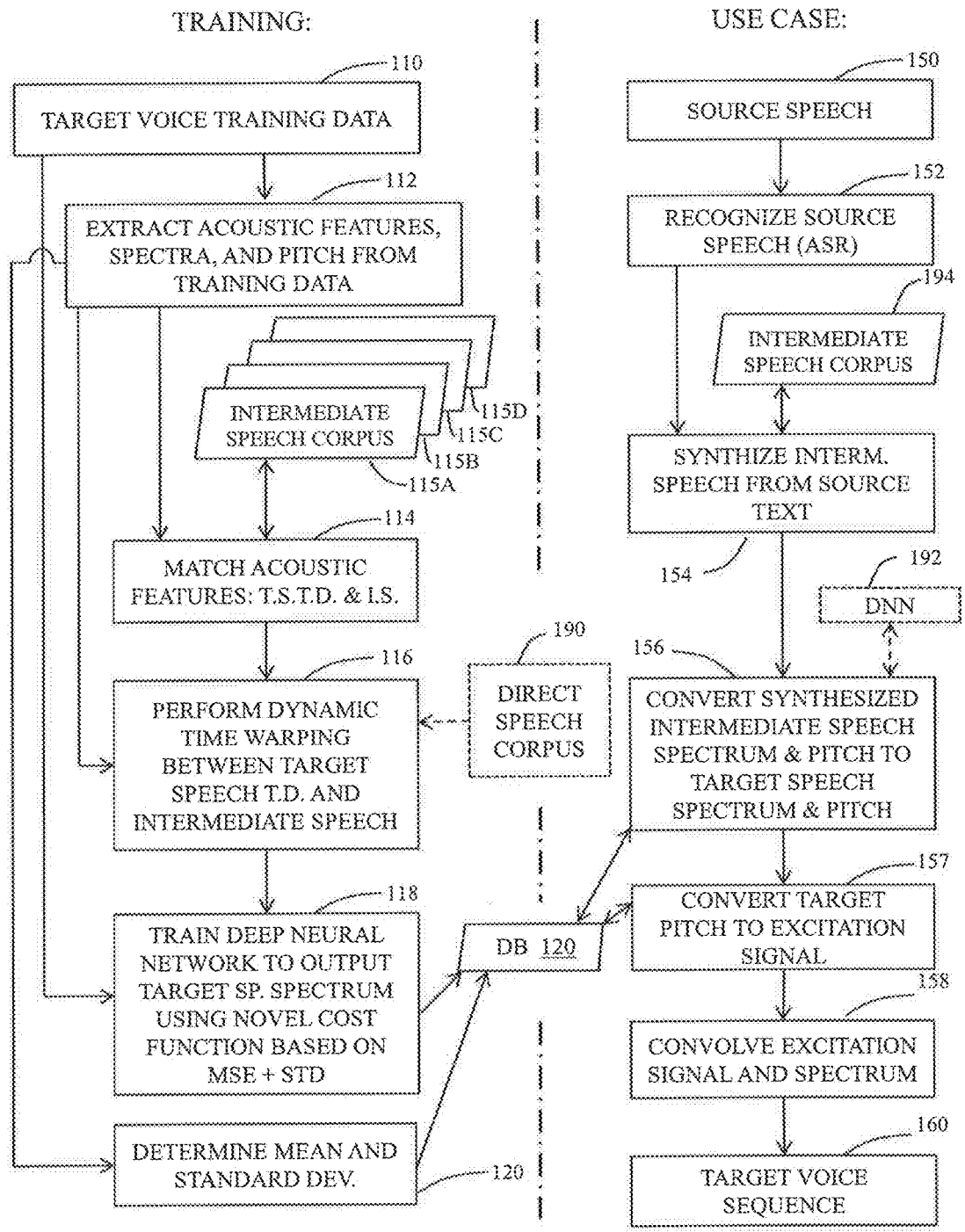

VOICE CONVERSION USING DEEP NEURAL NETWORK WITH INTERMEDIATE VOICE TRAINING

CROSS-REFERENCE TO RELATED APPLICATION(S)

This application claims the benefit of U.S. Provisional Patent Application Ser. No. 62/201,960 filed Aug. 6, 2015, titled "VOICE CONVERSION USING DEEP NEURAL NETWORK WITH INTERMEDIATE VOICE TRAINING," which is hereby incorporated by reference herein for all purposes.

TECHNICAL FIELD

The invention generally relates to technique for voice conversion. In particular, the invention relates to a system and method for employing two levels of voice conversion and optimal neural network training to achieve voice conversion with high fidelity.

BACKGROUND

There are numerous voice conversion systems for converting speech from a source speaker into a target speaker. These techniques generally require substitution of audio data of the source speaker with audio data of the target speaker. This process, however, typically introduces unwanted sound artifacts. While high-pass filtering may reduce these sound artifacts, the quality of the target speech may also be reduced which yields a muffled sounding speaker. There is therefore a need for a voice conversion system that produces target speech with high fidelity and minimal acoustic artifacts.

SUMMARY

The invention in some embodiments features a system and method of converting source speech to target speech using intermediate speech data. The method comprises receiving target voice training data and intermediate speech data; extracting a first set of acoustic features and pitch from the target voice training data; identifying a second set of acoustic features from the identified intermediate speech data; identifying intermediate speech data that match target voice training data based on the first set and second set of acoustic features; performing dynamic time warping to align the second set of acoustic features of intermediate speech data and the first set of acoustic features of target voice training data; training a neural network to convert the second set of acoustic features to the first set of acoustic features based on the matches after alignment by dynamic time warping; receiving source speech data; converting the source speech data to an intermediate speech; converting the intermediate speech to a target speech sequence using the neural network; and converting the target speech sequence to target speech using the pitch from the target voice training data.

In some embodiments, the step of training the neural network is based on back propagation and the back propagation employs a cost function based, in part, on a mean square error and standard deviation of the target speech training data. The first set of acoustic features and a second set of acoustic features comprise mel-cepstrum coefficient, Linear Predictive Coding (LPC) coefficients, Line Spectral Pairs (LSP), raw log-spectrum, and linguistic features.

BRIEF DESCRIPTION OF THE DRAWINGS

The present invention is illustrated by way of example and not limitation in the figures of the accompanying drawings, and in which:

FIG. 1 is a flowchart of the process of training and using a deep neural network to convert source speech to target speech, in accordance with a preferred embodiment of the present invention.

DETAILED DESCRIPTION OF THE PREFERRED EMBODIMENT

Figures 2A, 2B, 2C, 2D:
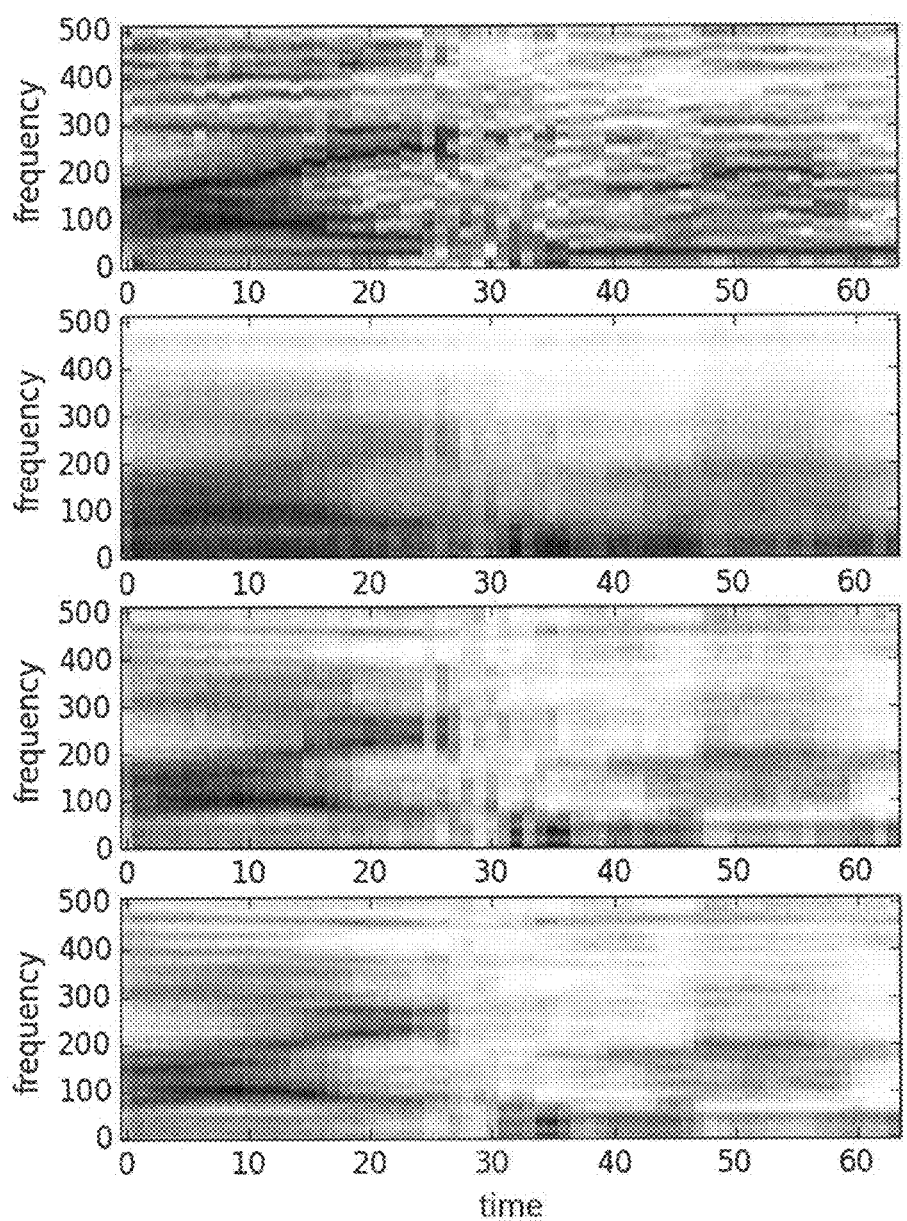
FIG. 2A is an original waveform spectrogram.
FIG. 2B is a waveform spectrogram converted to target spectrogram using DNN trained with the MSE criterion only.
FIG. 2C is a waveform spectrogram converted to target spectrogram using DNN trained with the MSE and STD criteria, in accordance with an embodiment of the present invention.
FIG. 2D is a waveform spectrogram converted to target spectrogram using DNN trained with the MSE and STD criteria after high-pass filtering, in accordance with an embodiment of the present invention.

The present invention is a system and method for converting source speech to target speech. The source speech is typically an audio file or audio stream including linguistic content spoken in the voice of a user. The target speech is an audio file or audio stream including the linguistic content of the source speech but recreated in the voice of a speaker selected by the user, i.e., a target speaker. The target speech generally reflects the speaking style of the source speaker while reflecting voice color, pitch, and intonation of the target speaker. In some other embodiments, the target speech is in the voice of the user or other person, but reflects different emotions, i.e., target emotions (such as anger, sadness, happiness, etc), not present in the source speech. In the preferred embodiment, the source speech is converted using a deep neural network that is first trained and subsequently used to transform portions of the speech derived from the source speech into the target speech.

Illustrated in FIG. 1 is the process of training and implementing a deep neural network to convert the source speech into the target speech, i.e., speech having the linguistic content of the source speech but in the voice of the target speaker. First, the deep neural network is trained to convert samples of target speech, referred to herein as "target voice training data," into intermediate speech, which is a synthetic machine voice in this example. This process is illustrated on the left side of the flowchart in FIG. 1. Then, the source speech is converted to intermediate speech, and this intermediate speech converted to target speech using the deep neural network, as shown on the left hand side of FIG. 1. This method is described in more detail below.

The target voice training data is provided 110 as input to the voice conversion system. The training data preferably includes a recording of the target speaker talking, but may in some embodiments also take the form of a speech exemplar or voice corpus in the voice of the target speaker. The recording of the target speaker talking in the preferred embodiment generally includes the speech required to reproduce all the linguistic content of the source speech in the voice of the target. To capture the necessary linguistic content, the target speaker may be prompted to recite one or more sentences that include all or most of the most common phonemes and diphones in the English language.

In the preferred embodiment, the target voice is one of a plurality of target voices that may be selected by the user and utilized to generate target speech. That is, the target voice is one of a number of human and/or non-human voices to which the user can choose to convert his or her voice. In addition, the preferred target voice may be an emotion-neutral voice, for example, while other target voices may contain the same linguistic content but in different emotional states including happy, angry, sad, etc., or a combination thereof. The particular emotional state, in addition to the target speaker, may also be selected by the user to reflect the user's particular emotional intent at that moment.

The target speech training data is then parsed and the acoustic content from the target voice training data extracted 112. This acoustic content extracted generally includes the acoustic features as well as spectrum and pitch information. The spectrum and pitch information are calculated for discrete segments of audio data approximately 5 to 20 milliseconds long. In some embodiments, the start time, end time, and/or duration of each audio segment as it is presented in the training data. While the acoustic features are mel-cepstrum coefficients in the preferred embodiment, alternative feature representations may be based on Linear Predictive Coding (LPC) coefficients, Line Spectral Pairs (LSP), raw log-spectrum, and linguistic features, for example. The pitch information is represented using fundamental frequency (f0) of the signal. Further processing may be performed on the log-scaled f0 values since they are more relevant from the perception of the listener.

These acoustic features extracted from the training data are then used to identify 114 and retrieve matching audio segments of intermediate speech with similar acoustic features from the intermediate speech corpus 115. That is, for each segment of training data, the voice conversion system retrieves the most similar segment of intermediate speech based on the acoustic features, i.e., mel-cepstrum coefficients, extracted. The target voice training data and matching audio data for the intermediate speech are then provided as output to the next stage of processing. The output data may further include the start time and stop time of each audio segment and/or duration of the respective audio segments.

In one embodiment, the intermediate speech is audio data including a natural-sounding machine voice generated using any of various techniques known to those skilled in the art. One exemplary machine speech generator is disclosed in U.S. Pat. No. 8,527,276 which is hereby incorporated by reference herein.

In some embodiments, the intermediate speech is generated from one of a plurality of intermediate speech corpuses 115A-115D. The particular speech corpus 115A selected may be chosen based on the voice color and speaking style of the source and target speakers as well as one or more metrics shared by those speakers. If the source and target speaker are both female, for example, the intermediate speech corpus selected is also that of a female, thereby yielding a better conversion from source speech to intermediate speech to target speech. Other metrics that may be included in selecting an intermediate speech corpus include gender, age, ethnicity, native language or accent, etc.

Next, the voice conversion system performs Dynamic Time Warping (DTW) 116 to align the audio segments of the target voice training data and matching segments of intermediate speech. In particular, each audio segment of training data 110 is either stretch or compressed so that it is the same duration as the matching segment of intermediate speech. DTW effectively compensates for the different rate at which words, phrases, and sentences are spoken in the target speech training data versus the intermediate speech.

The deep neural network (DNN) is then trained 118 with the selected intermediate speech and target speech training data after alignment with DTW. In particular, the DNN relates a spectral representation of the intermediate voice segment (i.e., the input) with a spectral representation of the target voice training data (i.e., the output). Thus, when a spectrum for intermediate speech is presented as input, the DNN identifies and outputs the best matching spectrum of the target speech at the output. In the preferred embodiment, the DNN is a four layer neural network. The number of nodes at the input depends on the spectral content of input phonemes. The number of nodes at each subsequent layer depends in part on the spectral content of the audio segments provided as input as well as the quality of the output required. Thereafter, the voice conversion system also computes 120 the mean pitch and standard deviation for the audio segment of the target speech training data based on the data extracted in step 112 above. The representation of the DNN, mean pitch, and standard deviation are stored in a DB 120 for later use by the voice conversion system.

In accordance with the preferred embodiment of the present invention, the DNN is trained using a back-propagation technique that employs a novel cost function. Guided by the cost function, the back-propagation technique selectively strengthens or weakens various DNN link weights and biases that govern the selection of a segment of target speech for each given audio segment of intermediate speech provided as input. Let $X=[X_1, \ldots, X_N]$ and $Y=[Y_1, \ldots, Y_N]$ be matrices representing sequences of spectral features of an audio segment spoken by the source speaker and the target speaker, respectively. The dimension of the matrices are ×M, where N is the number of data samples and M is the dimension of the spectral representation (for example for 16 kHz speech, it is recommended to use 40th order mel-cepstrum coefficients). The DNN is then configured to optimize the F function:

$$\hat{Y}=F(X)$$

such that $\hat{Y}$ is the most similar to Y. In the present invention, the Y and $\hat{Y}$ spectra are deemed to be most "similar" if the Mean Squared Error (MSE) and the standard deviation of the spectral representations are minimized. This approach serves to match the spectral values as well as the spectral movements, which is important in human speech. The proposed cost function, also referred to herein as the proposed criterion, is given by:

$$\text{ProposedCriterion}=MSE(Y,F(X))+STD(Y,F(X))$$

where $$STD(Y,\hat{Y})=MSE(SD(Y),SD(\hat{Y}))$$

where SD(Y) is a 1×M matrix in which each column represents the standard deviation of each dimension, computed for each dimension m as $$SD_m(Y) = \sqrt{\sum_{n=1}^{N}\left(Y_{n,m} - \left(\frac{1}{N}\right)\sum_{j=1}^{N}Y_{j,m}\right)^2}$$

The vectors X and Y can be used to train the DNN using a batch training process that evaluates all data at once in each iteration before updating the weights and biases. In an alternate embodiment, training is performed in mini batches sometimes referred to as stochastic gradient descent where the batch of all samples is split into smaller batches, e.g., 100 samples each, and the weights and biases updated after each mini-batch iteration. The effect of training the DNN using this approach is shown in the FIGS. 2C-2D.

In some prior art systems, spectra are deemed to be "similar" if only the mean squared error (MSE) between them is minimal:

$$MSE(Y, \hat{Y}) = \left(\frac{1}{MN}\right)\sum_{n=1}^{N}\sum_{m=1}^{M}(Y_{n,m} - \hat{Y}_{n,m})^2$$

The purpose of matching standard deviation in addition to mean squared error is to lessen the effect of "over-smoothing", which is a problem well known to those skilled in the art. Over-smoothing produces a muffling sound effect in the generated speech. If the training criterion is based on the MSE alone, the DNN parameters are trained to produce highly averaged features. This is one major cause of the over-smoothing problem. This muffling effect is evident in the FIG. 2B, which shows very wide formant peaks. The relatively wide peaks can be contrasted with the sharp and prominent peaks present in actual speech from a real person, as illustrated in FIG. 2A. Inclusion of the standard deviation in the training criterion reduces this averaging and produces more human-like spectral features. This is evident in FIG. 2C where the formant peaks in the frequency domain are more prominent. In some embodiments, the voice conversion system is configured to further sharpen the formants peaks using a high-pass filter in the log-spectrum domain, for example. High-pass filtering may be performed as a post-processing step to produce the waveform spectrogram illustrated in FIG. 2D.

For learning the transformation between source and target pitch values, the mean and standard deviation of the log-f0 values are calculated. These two values will be used later during the conversion to change the input log-f0 sequence to match the calculated mean and standard deviation.

The DNN with optimal training produced in step 118 is made available for conversion of the source speech after completion of the training above. Referring to the right side of FIG. 1, the user may provide 150 source speech by speaking or typing into the user's mobile phone or other audio interface, for example. The source speech includes audio data in the form of a data file or data stream, for example, that is transmitted to an ASR unit that recognizes and extracts 152 words and/or other linguistic content. In some embodiments, the ASR unit also outputs the start time and end time and/or duration of each of the extracted words as it appears in the source voice recording.

Once the source speech is converted to text, that text is used to synthesize 154 intermediate speech using a processes call text-to-speech (TTS) synthesis. In the preferred embodiment, this intermediate speech is generated by querying an intermediate speech corpus 194 using the converted text. That is, each word spoken by the user is used to retrieve a spectrum and pitch for the segment of speech as defined in the intermediate speech corpus. In the preferred embodiment, this intermediate speech corpus is the same intermediate speech corpus 115A selected from the plurality of corpuses 115A-115D.

Each spectrum and pitch of the synthesized intermediate speech is then converted 156 by the DNN into a target speech spectrum and pitch. The pitch corresponding to the target speech training data is then converted 157 to an excitation signal, and the excitation signal convolved 158 with the target spectrum retrieved from the DNN after conversion 156. Each convolution 158 produces a segment of target speech in the voice of the target, and the plurality of target speech segments produce 160 a target voice sequence that may also be referred to as target speech. In accordance with this invention, the target speech has the linguistic content of the source speaker but the voice color of the target speaker.

The segments of target speech from the DNN are concatenated into a file, stream, or other sequence and the speech transmitted or otherwise provided to the user to play, transmit, or save, for example. As stated, the converted speech includes the same linguistic content as the source speech data. The intonation of the source speech is linearly mapped to have the same average as the average of the target intonation, by multiplying the source fundamental frequency by a constant value, which the constant value is computed from the training sentences. The intonation is represented using a sequence of frequency values comprising the fundamental frequency, f0, in a sequence of frames. This sequence of fundamental frequencies, f0, may be referred to as the pitch contour. The pitch contour of the source speech is transformed linearly so that its average and standard deviation is the same at the calculated average and standard deviation of the pitch contour of the target, respectively.

In the preferred embodiment described above, intermediate speech is used as an intermediate language to convert source speech to target speech in real time. In some alternate embodiments, voice conversion can be used convert a particular machine voice to a target voice. For example, the voice of a Global Positioning Satellite (GPS) navigation system may be converted to the voice of an actor with a pleasing voice. In this scenario, the GPS speech may be used directly to train the DNN and converted directly to the target speech, which is illustrated by way of direct speech corpus 190 and direct speech 192.

In another embodiment, linguistic content in the form of words or text is directly converted to a target speech. The text from a phone or e-book reader, for example, may be converted to the intermediate speech and that speech then converted to the target speech. As can be appreciated, the preferred embodiments demonstrate that the invention applies equally well to the conversion of text, human speech, or machine speech to any of a number of target voices reflecting any of a number of emotional states.

Figure 3:
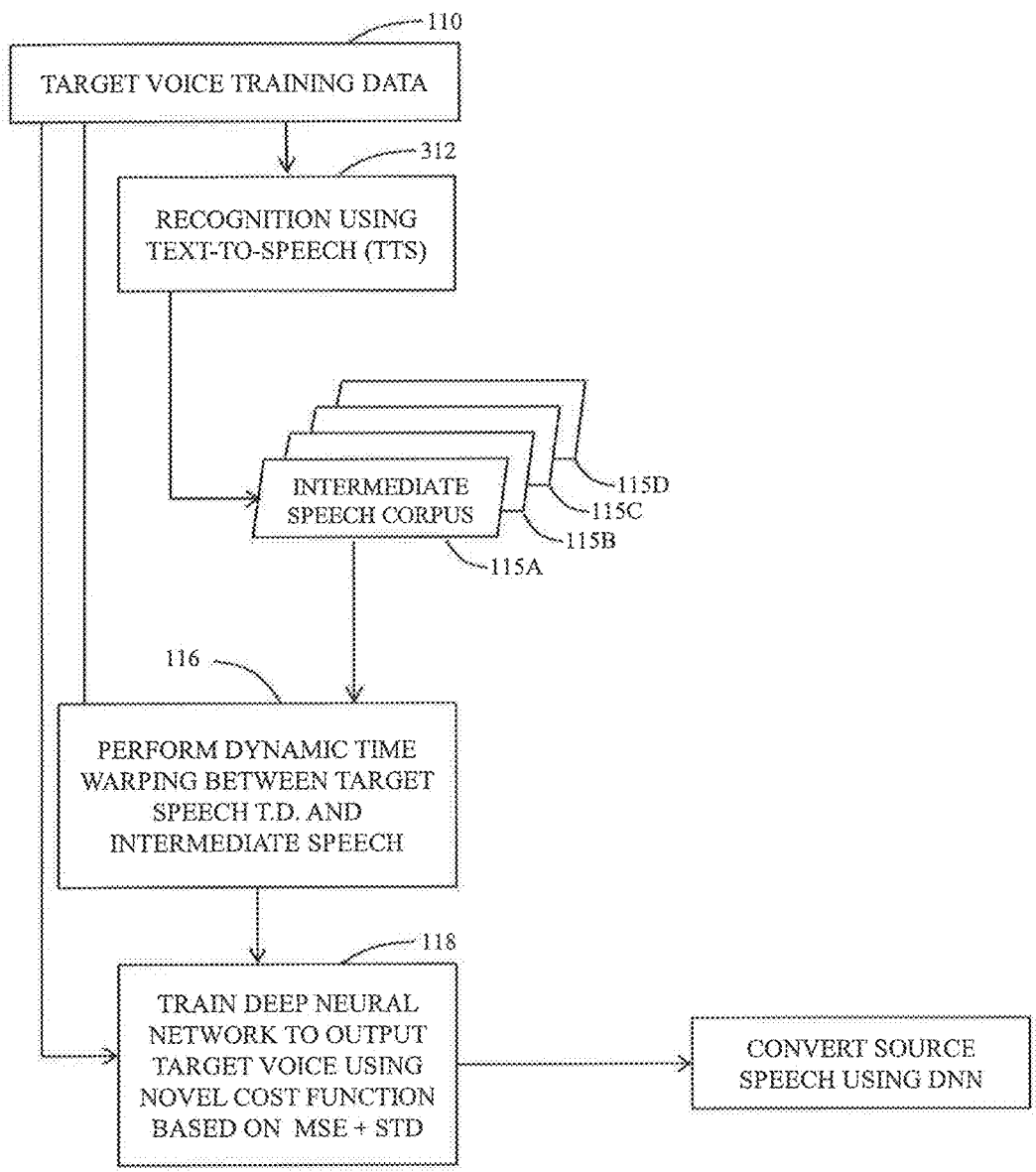
FIG. 3 is a flowchart of an alternate process of training a deep neural network to convert source speech to target speech, in accordance with a preferred embodiment of the present invention.

Illustrated in FIG. 3 is a DNN training technique used in alternative to the training technique illustrated on the left hand side of FIG. 1. In this embodiment, the target speech training data received at input is processed using text-to-speech (TTS) which recognizes 312 the words spoken by the target speaker. Those words are then used to look up and retrieve intermediate voice speech from the intermediate speech corpus 115A. The segments of intermediate speech retrieved from the corpus are aligned 116 with the corresponding segments of target speech training data 110. After alignment, the pairs of target speech and intermediate speech segments are used to train 118 the DNN using the novel cost function described above. Once trained, the DNN may be used to convert intermediate speech derived from source speech data into the final target speech in the same manner described in reference to the right hand side of FIG. 1.

Figure 4:
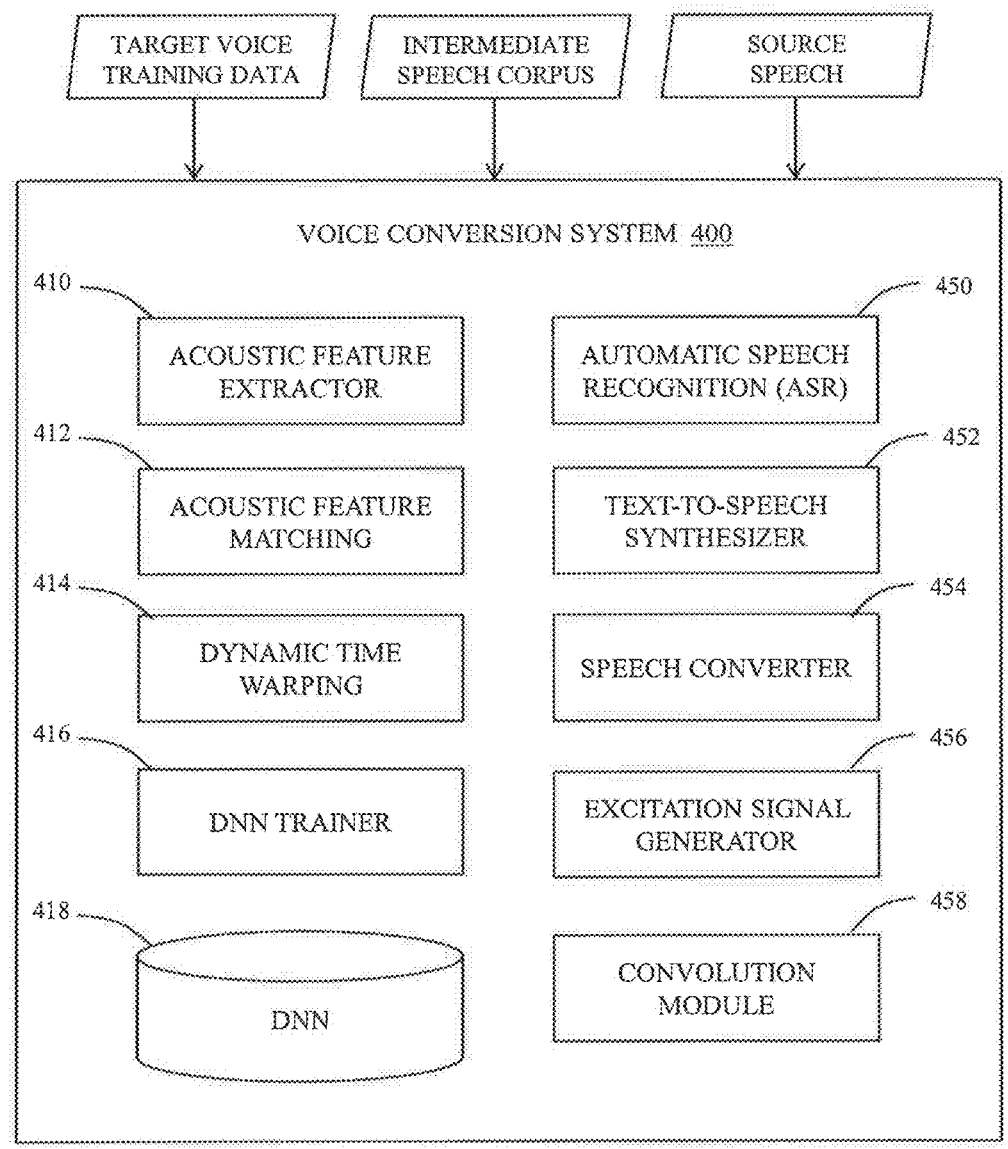
FIG. 4 is a functional block diagram of the voice conversion system, in accordance with a preferred embodiment of the present invention.

Illustrated in FIG. 4 is a functional block diagram of the voice conversion system (VCS) 400 of the preferred embodiment. For training of the neural network, the VCS preferably includes an acoustic feature extractor for extracting mel-cepstrum coefficients, for example, from the target speech training data; an acoustic feature matching module 412 for identifying the spectra or other acoustic features of intermediate speech that best matches target speech training data; a dynamic time warping module 414 for performing temporal alignment of audio segments of target speech training data and intermediate speech; and a DNN training module 416 for optimizing a DNN to output a target speech spectrum based on input of an intermediate speech spectrum; and the DNN database 418 for storing spectral data as well as pitch data.

For conversion of source speech, the VCS preferably includes an automatic speech recognition module 450; a text-to-speech synthesizer 452; a speech converter 454 for querying the DNN with intermediate speech spectra; an excitation signal generator 456 for processing pitch data which is filtered by the spectral data using the convolution module 458.

One or more embodiments of the present invention may be implemented with one or more computer readable media, wherein each medium may be configured to include thereon data or computer executable instructions for manipulating data. The computer executable instructions include data structures, objects, programs, routines, or other program modules that may be accessed by a processing system, such as one associated with a general-purpose computer or processor capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system. Examples of mass storage devices incorporating computer readable media include hard disk drives, magnetic disk drives, tape drives, optical disk drives, and solid state memory chips, for example. The term processor as used herein refers to a number of processing devices including personal computing devices, servers, general purpose computers, special purpose computers, application-specific integrated circuit (ASIC), and digital/analog circuits with discrete components, for example.

Although the description above contains many specifications, these should not be construed as limiting the scope of the invention but as merely providing illustrations of some of the presently preferred embodiments of this invention.

Therefore, the invention has been disclosed by way of example and not limitation, and reference should be made to the following claims to determine the scope of the present invention.

I claim:
1. A method of converting source speech to target speech, the method comprising:
  receiving a first plurality of target voice training data and a second plurality of intermediate speech data, wherein the first plurality of target voice training data is speech and the second plurality of intermediate speech data is speech;
  extracting a first set of acoustic features and pitch from the first plurality of target voice training data;
  identifying a second set of acoustic features from the identified second plurality of intermediate speech data;
  identifying matches between the second plurality of intermediate speech data and first plurality of target voice training data based on the first see and second set of acoustic features;
  performing dynamic time warping to align the second set of acoustic features of the second plurality of intermediate speech data and the first set of acoustic features of the first plurality of target voice training data;
  training a neural network to convert the second set of acoustic features to the first set of acoustic features based on the matches after alignment by dynamic time warping;
  acquiring, with a mobile phone, a third plurality of source speech from a source speaker, wherein the third plurality of source speech is speech;
  converting the third plurality of source speech to a fourth plurality of intermediate speech;
  converting the fourth plurality of intermediate speech to a target speech sequence using the neural network, wherein the target speech sequence comprises a fifth plurality of target speech;
  converting the target speech sequence to target speech audio using the pitch from the first plurality of target voice training data, wherein the target speech sequence is speech; and
  playing, with the mobile phone, target speech audio to the source speaker.

2. The method of converting source speech of claim 1, wherein the step of training the neural network is based on back propagation.

3. The method of converting source speech of claim 2, wherein the back propagation employs a cost function based, in part, on a mean square error and standard deviation of the first plurality of target speech training data.

4. The method of converting source speech of claim 1, wherein the first set of acoustic features and a second set of acoustic features comprise mel-cepstrum coefficients.

5. The method of converting source speech of claim 1, wherein the first set of acoustic features and a second set of acoustic are selected from the group consisting of: Linear Predictive Coding (LPC) coefficients, Line Spectral Pairs (LSP), raw log-spectrum, and linguistic features.

6. The method of converting source speech of claim 1, wherein the steps of converting the third plurality of source speech to the fourth plurality of intermediate speech comprises:
  identify words spoken by a source speaker using automatic speech recognition; and
  synthesizing the fourth plurality of intermediate speech using the recognized words.

7. The method of converting source speech of claim 1, wherein the step of converting the target speech sequence to target speech using the pitch from the first plurality target voice training data comprises:
   generating spectra from the target speech sequence;
   generating an excitation signal from the pitch; and
   convolving the excitation signal with generated spectra.

8. The method of converting source speech of claim 1, wherein the second plurality of intermediate speech data is selected from a plurality of speech corpora.

9. The method of converting source speech of claim 8, wherein the second plurality of intermediate speech data is selected from a sixth plurality of intermediate speech corpora based on similarity between the second plurality of plurality of intermediate speech corpora and the first plurality of target speech training data.

10. The method of converting source speech of claim 9, wherein similarity is based on one or more of the following attributes: gender, age, ethnicity, native language or accent.

11. A method of converting source speech to target speech, the method comprising:
   receiving a first plurality of target voice training data, wherein the first plurality of target voice training data is speech;
   extracting a first set of spectral features and pitch from the first plurality of target voice training data;
   retrieving, based on the first set of spectral features, a second set of spectral features for an intermediate speaker that match the first plurality of target voice training data;
   perform dynamic time warping to match the second set of spectral features and the first et of spectral features;
   training a neural network to convert the second set of spectral features to the first set of spectral features;
   acquiring with a mobile phone, a third plurality of source speech from a source speaker, wherein the source speech is speech;
   converting the third plurality of source speech to a fourth plurality of intermediate speech, wherein the fourth plurality of intermediate speech is speech;
   converting the fourth plurality of intermediate speech to a target speech sequence using the neural network, wherein the target speech sequence comprises a fifth plurality of target speech;
   convert the target speech sequence to target speech audio using the pitch from the first plurality of target voice training data, wherein the target speech sequence is speech; and
   playing, with the mobile phone, the target speech audio to the source speaker.

12. A method of converting source speech to target speech, the method comprising:
   receiving a first plurality of target voice training data, wherein the first plurality of target voice training data is speech;
   recognizing a plurality of words spoken by a target speaker from the first plurality of target voice training data;
   retrieving a second plurality of intermediate speech based on the recognized words;
   perform dynamic time warping to align the retrieve second plurality of intermediate speech with the corresponding first plurality of target voice training data;
   training a neural network to convert the aligned second plurality of intermediate speech to first plurality of target speech training data;
   acquiring, with a mobile phone, a third plurality of source speech from a source speaker;
   converting the third plurality of source speech to a fourth plurality of intermediate speech, wherein the fourth plurality of intermediate speech is speech;
   converting the fourth plurality of intermediate speech to a target speech sequence using the neural network, wherein the target speech sequence comprises a fifth plurality of target speech;
   converting the target speech sequence to target speech audio, wherein the target speech sequence is speech; and
   playing with the mobile phone, the target speech audio to the source speaker.

* * * * *